(12) United States Patent
Rune et al.

(10) Patent No.: US 10,735,372 B2
(45) Date of Patent: Aug. 4, 2020

(54) NETWORK NODE AND METHOD FOR HANDLING A TRAFFIC FLOW RELATED TO A LOCAL SERVICE CLOUD

(71) Applicant: Telefonaktiebolaget LM Ericsson (publ), Stockholm (SE)

(72) Inventors: Johan Rune, Lidingö (SE); Lars Westberg, Enköping (SE); Vinay Yadhav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 434 days.

(21) Appl. No.: 15/507,798

(22) PCT Filed: Sep. 2, 2014

(86) PCT No.: PCT/SE2014/051007
§ 371 (c)(1),
(2) Date: Mar. 1, 2017

(87) PCT Pub. No.: WO2016/036287
PCT Pub. Date: Mar. 10, 2016

(65) Prior Publication Data
US 2017/0250948 A1 Aug. 31, 2017

(51) Int. Cl.
*H04L 29/12* (2006.01)
*H04L 12/46* (2006.01)
*H04L 29/08* (2006.01)

(52) U.S. Cl.
CPC ...... *H04L 61/2046* (2013.01); *H04L 12/4641* (2013.01); *H04L 67/10* (2013.01);
(Continued)

(58) Field of Classification Search
CPC .................. H04L 12/4641; H04L 61/2046
See application file for complete search history.

(56) References Cited

U.S. PATENT DOCUMENTS 8,194,674 B1    6/2012  Pagel et al.
8,966,075 B1 *  2/2015  Chickering ......... H04L 12/4641
                                                    709/220
(Continued)

FOREIGN PATENT DOCUMENTS

EP     2482496 A1     8/2012
WO  2010130270 A1    11/2010
(Continued)

OTHER PUBLICATIONS

Unknown, Author, "Smarter Wireless Networks", IBM Software Telecommunications, 2013, 1-8.

*Primary Examiner* — Jeong S Park
(74) *Attorney, Agent, or Firm* — Murphy, Bilak & Homiller, PLLC (57) ABSTRACT

A method in a network node for handling a traffic flow of a User Equipment, UE is provided. The network node is related to a local service cloud. The traffic flow is related to an application session to be served by the local service cloud. The network node identifies (202) a UE Internet Protocol, IP, address of the UE. When the identified UE IP address is used by another UE in a first Virtual Local Area Network, VLAN, comprised in the local service cloud, the network node selects (204) a second VLAN comprised in the local service cloud for local break out of the traffic flow of the application session to the local service cloud. In the second VLAN, the identified UE IP address is not used by another UE.

24 Claims, 5 Drawing Sheets

(52) U.S. Cl.
CPC ...... *H04L 61/2007* (2013.01); *H04L 61/2038* (2013.01); *H04L 61/2514* (2013.01)

(56) References Cited

U.S. PATENT DOCUMENTS

| | | | |
|---|---|---|---|
| 2009/0198800 A1* | 8/2009 | Dighe | H04L 29/12028 709/221 |
| 2010/0322253 A1* | 12/2010 | Zhang | H04L 12/4625 370/395.53 |
| 2011/0292896 A1 | 12/2011 | Yeuom et al. | |
| 2012/0163388 A1 | 6/2012 | Goel et al. | |
| 2012/0222037 A1* | 8/2012 | Labat | G06F 9/5072 718/104 |
| 2013/0044641 A1 | 2/2013 | Koponen et al. | |
| 2013/0054761 A1 | 2/2013 | Kempf et al. | |
| 2013/0294240 A1 | 11/2013 | Suni | |
| 2013/0297729 A1 | 11/2013 | Suni et al. | |
| 2014/0056290 A1* | 2/2014 | Pazhyannur | H04W 4/00 370/338 |
| 2014/0064285 A1* | 3/2014 | Kaippallimalil | H04L 12/2874 370/392 |
| 2014/0092907 A1* | 4/2014 | Sridhar | H04L 12/4641 370/392 |
| 2014/0241247 A1 | 8/2014 | Kempf et al. | |
| 2015/0312208 A1* | 10/2015 | Chatterjee | H04L 61/2015 709/245 |
| 2015/0334009 A1* | 11/2015 | Clark | H04L 12/4633 370/252 |

FOREIGN PATENT DOCUMENTS

| | | |
|---|---|---|
| WO | 2011056714 A2 | 5/2011 |
| WO | 2012022357 A1 | 2/2012 |
| WO | 2013135913 A2 | 9/2013 |
| WO | 2013135914 A2 | 9/2013 |

* cited by examiner

NETWORK NODE AND METHOD FOR HANDLING A TRAFFIC FLOW RELATED TO A LOCAL SERVICE CLOUD

TECHNICAL FIELD

Embodiments herein relate to a network node and a method therein. In particular, it relates to handling a traffic flow of a User Equipment (UE) which traffic flow is related to an application session to be served by a local service cloud.

BACKGROUND

Wireless terminals for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE is controlled by the radio base station.

Local service clouds in a base station are demanded to optimize a backhaul network. In a hierarchical telecommunications network the backhaul portion of the network comprises the intermediate links between a core network or a backbone network and small sub-networks at the edge of the entire hierarchical network, such as e.g. between a base station and a radio network controller.

Cloud computing in general may be portrayed as a synonym for distributed computing over a network, with the ability to run a program or application on many connected computers at the same time. It specifically refers to a Computing hardware machine or group of computing hardware machines commonly referred as a server connected through a communication network such as internet, intranet, Local Area Network (LAN) or Wide Area Network (WAN) and Individual user or users as well as base stations who have permission to access the server can use the server's processing power for their individual computing needs like to run an application, store data or any other computing need alike.

The local service clouds in a base station enable local functions to be added to the base station such as e.g. data compression, tunneling, and Forward Error Correction (FEC) function to enhance the backhaul when internet is used as a backhaul. Further examples are local applications, e.g. the backhaul network usually has bottlenecks that will limit the performance of the applications at the core network sites. Applications running in the local service cloud at the base station site will fully utilize the radio link.

One of the problems to enable application execution for a UE at a base station site is the local breakout of traffic from the Radio Bearers (RBs) to the local application at the local service cloud. The RBs will be further explained below. The local breakout is usually realized by a classifier which inspects passing data traffic. Based on the inspected passing data traffic, the classifier classifies the data traffic e.g. based on Differentiated Services Code Point (DSCP) and/or 5-tuple. A 5-tuple refers to a set of five different values related to a Transmission Control Protocol/Internet Protocol (TCP/IP) connection. The 5-tuple includes a source IP address/port number, destination IP address/port number and the protocol in use. Based on the classified data traffic, the classifier then routes traffic classified as local application traffic through a specific interface between the base station and the local service cloud.

In the end-to-end traffic in this example where one end is the UE and the other end is the server where the application/service is running, the non-local traffic may be tunneled within a GTP-tunnel. The classification is made on the end-to-end traffic instead of the tunnel header. This is known for people skilled in 3GPP-architecture.

There are many bearers, i.e. GTP-tunnels to a base station and there are many base stations. Due to the mobility of the UEs the UEs connected to a base station is varying over-time i.e. one UE moves its connection between many base stations. The specific set of UEs connected to one base-station is therefore varying over time. A RB is an association for the base-station to know how and to which UE the traffic should be sent to. The RB has two directions, one uplink direction which is the traffic from the UE to the base station, and one downlink direction which is the traffic from the base station towards the UE.

The traffic in the uplink can easily be classified and broken out, i.e. routed to the local service cloud. If any kind of tunnel header is used for a broken out packet, such as a GTP tunnel header, it is stripped off before the packet is delivered to the application server in the local service cloud, such that the application server only receives the native end-to-end packets.

An IP address is allocated to a UE when a default bearer is activated. The IP address allocated for the default bearer is used for the dedicated bearers within the same Packet Data Network connection. A major problem in this scenario is that the UE's IP address cannot be guaranteed to be unique. Several UEs may be allocated the same private IP address. This is most critical when the traffic shall be routed downlink and the traffic from the local service cloud shall be inserted, i.e. broken in, into a RB belonging to the correct UE. There are many UEs and downlink RBs to select between and a native IP packet which is sent from the local service cloud has no relation to UE identities or RB identities. The lack of guaranteed IP address uniqueness is a problem also in the uplink, since the traffic from different UEs may interfere, i.e. be mixed with each other and confuse the application servers in the local service cloud. The applications in the local service cloud require different UE IP addresses and an operating system uses the UE IP addresses and port numbers as identifiers of the application sessions.

Note also that one UE may use several servers in the local service cloud such that traffic from those servers must be broken in and routed to the same UE.

An Evolved Packet System (EPS) is a central network portion of the UMTS LTE mobile communication system. An EPS primarily transfers packet data between edge networks and the radio access network. In an EPS network a bearer between a UE and a Packet Data Network (PDN) Gateway (PGW) is denoted "EPS bearer". In between the UE and the PGW the EPS bearer traverses an eNodeB (eNB) and a Serving Gateway (SGW). The parts of the EPS bearer between the PGW and the SGW and between the SGW and the eNB are realized through GTP tunnels. The part of the EPS bearer between the eNB and the UE is realized through radio interface user plane protocols and is denoted Radio Bearer (RB). An EPS bearer is bidirectional, i.e. it has both an uplink and a downlink direction.

A solution is to handle the problem of non-unique UE addresses by introducing Network Address Translation (NAT) between the UE and the local service cloud.

NAT

Primarily NAT was introduced to the world of Information Technology (IT) and networking due to the lack of IP addresses. When computers and servers within a network communicate, they need to be identified to each other by a unique address, in which resulted in the creation of a 32 bit number, and the combinations of these 32 bits would accommodate for over 4 billion unique addresses, known as IP address. This was named IPv4, and although over 4 billion addresses sounds a lot, it really is not considering how fast the world of computers and the internet has grown.

To circumvent this problem, a temporary solution was produced known as NAT. NAT resulted in two types of IP addresses, public and private. A range of private addresses were introduced, which anyone could use, as long as these were kept private within the network and not routed on the internet.

NAT allows the use these private IP address on the internal network. So within a private network a unique IP address is assigned to all computers, servers and other IP driven resources in the private network. Another company can use the same private IP addresses as well, as long as they are kept internal to their network. So two companies may use the same range of IP addresses but because they are private to their network, they are not conflicting with each other.

However when internal hosts need to communicate with a public network such as the Internet the public address is used. This address is a routable public address everyone can see, which would represent the network gateway of the user. This public address would be unique; no one else would use this address.

A problem with a NAT solution is that the NAT:ed UE-addresses are locally unique. The uniqueness will not hold in mobile scenarios, where movements may cause the UE to connect to a new local service cloud in which the NAT:ed IP address is not unique.

Another problem with the NAT solution is that a NAT includes a state that makes it difficult to interwork with mobility. The connectivity is broken when the mobile is handed over to another base-station.

A yet further problem with the NAT solution is that some applications may not work equally well when there is a NAT in a path. Here the path refers to the connection between the two ends of a communication.

The lack of uniqueness of the UE IP address is a consequence of 3GPP architecture where the core network decides and allocates an IP address range to each Access Point Name (APN). The same IP address range or overlapping ranges may be allocated to different APNs, such that IP addresses can be reused between APNs.

An APN identifies a PDN that a mobile data user wants to communicate with. In addition to identifying a PDN, an APN may also be used to define the type of service, such as e.g. connection to a wireless application protocol server, multimedia messaging service (MMS), which is provided by the PDN. APN is used in 3GPP data access networks, e.g. General Packet Radio Service (GPRS), and Evolved Packet Core (EPC).

SUMMARY

It is therefore an object of embodiments herein to provide a way of improving the performance in a wireless radio network using local service clouds.

According to a first aspect of embodiments herein, the object is achieved by a method in a network node for handling a traffic flow of a User Equipment, UE. The network node is related to a local service cloud. The traffic flow is related to an application session to be served by the local service cloud.

The network node identifies a UE Internet Protocol, IP, address of the UE. When the identified UE IP address is used by another UE in a first Virtual Local Area Network, VLAN, comprised in the local service cloud, the network node selects a second VLAN comprised in the local service cloud for local break out of the traffic flow of the application session to the local service cloud. In the second VLAN, the identified UE IP address is not used by another UE.

According to a second aspect of embodiments herein, the object is achieved by a network node for handling a traffic flow of a User Equipment, UE. The network node is arranged to be related to a local service cloud. The traffic flow is related to an application session to be served by the local service cloud. The network node is configured to identify a UE Internet Protocol, IP, address of the UE. The network node is further configured to select a second VLAN comprised in the local service cloud for local break out of the traffic flow of the application session to the local service cloud, when the identified UE IP address is used by another UE in a first Virtual Local Area Network, VLAN comprised in the local service cloud. In the second VLAN, the identified UE IP address is not used by another UE.

Since the network node keeps track of UE IP addresses that are being used within a certain VLAN, this information ensures that traffic flows to be broken out which originate from different UEs but have the same UE IP address are allocated to different VLANs.

In this way the traffic can be routed properly e.g. downlink and the traffic from the local service cloud shall be inserted, i.e. broken in, into a RB belonging to the correct UE, which results in an improved the performance in the wireless radio network using local service clouds.

BRIEF DESCRIPTION OF THE DRAWINGS

Examples of embodiments herein are described in more detail with reference to attached drawings in which.

DETAILED DESCRIPTION

Figure 1:
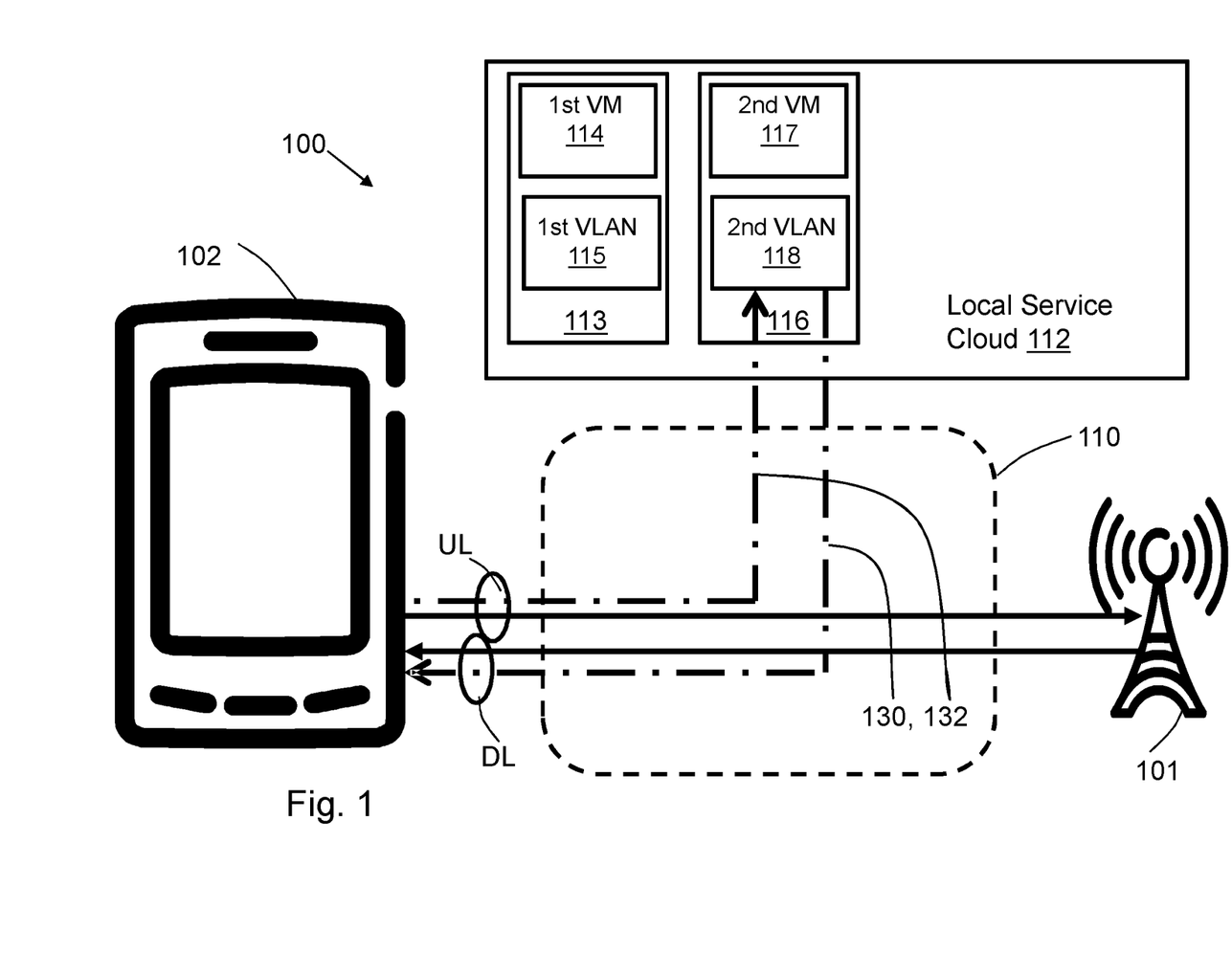
FIG. 1 is a schematic block diagram illustrating a wireless communications network.

FIG. 1 depicts a wireless radio network 100 in which embodiments herein may be implemented. The wireless radio network 100 is a wireless communication network such as an LTE, a WCDMA, a Wimax, or any cellular network or system.

Figure 3:
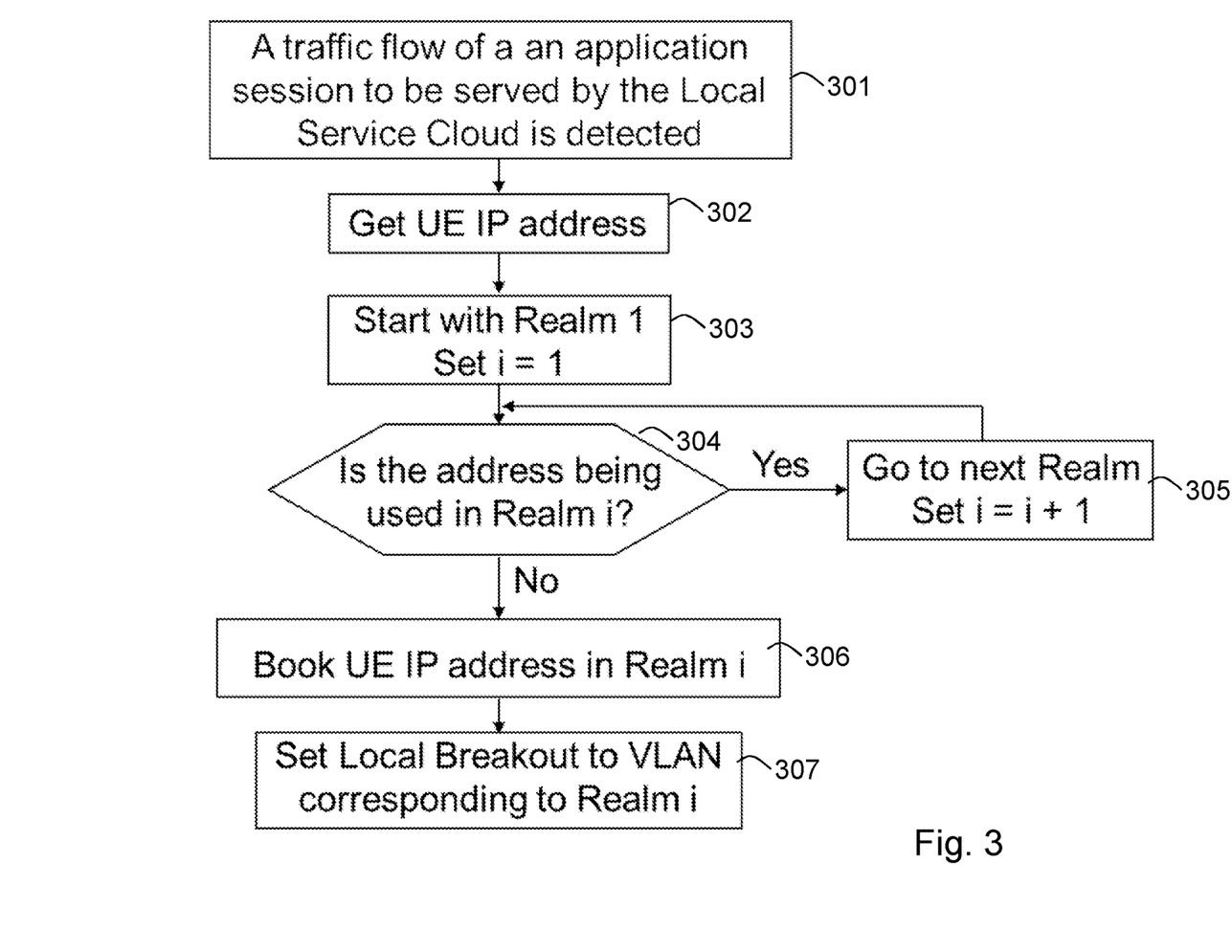
FIG. 3 is a flowchart depicting embodiments of a method in a network node.

A plurality of base stations operates in the wireless radio network 100, whereof one, a base station 101, is depicted in FIG. 3. The base station 105 is a base station which may be referred to as a transmission point, a radio base station, an eNB, an eNodeB, a Home Node B, a Home eNodeB or any other network node capable to a UE such as a mobile wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network.

A number of UEs operate in the wireless radio network 100. In the example scenario of FIG. 1, only UE 102 is depicted for simplicity. The UE 102 may e.g. be a mobile wireless terminal, a mobile phone, a computer such as e.g. a laptop, PDA or a tablet computer, sometimes referred to as a surf plate, with wireless capability, or any other radio network unit capable to communicate over a radio link in a wireless communications network. Please note the term user equipment used in this document also covers other wireless terminals such as Machine to machine (M2M) devices. Traffic flows are transmitted to the UE 102 from the base station 101 in a DL RB and from the UE 102 to the base station 101 in an UL RB.

The base station 105 is related to a network node 110. The network node 110 is related to a local service cloud 112. The network node may e.g. be a server.

The network node 110 handles local break out of traffic flows of application sessions of UEs to the local service cloud 112. This may e.g. be performed by a local breakout router and functionality comprised in the network node 110.

In some embodiments, the network node 110 is a node of its own connected to the base station 101. In some other embodiments the network node 110 is co-located with the base station 101 or comprised in the base station 101.

The local service cloud 112 comprises one or more realms such as a first realm 113. In some embodiments the first realm 113 comprises a first Virtual Machine (VM) 114 associated with one or more Virtual Local Area Networks (VLANs) such as a first VLAN 115.

Realm is a term used to define isolated or a separated space, in this context the realm is used to define a space where the IP address of the UE is unique and does not collide with any other UE IP in the realm.

The local service cloud 112 further comprises a second realm 116. In some embodiments the first realm 116 comprises a second VM 117 associated with a second VLAN 118. In some embodiments the second VLAN 118 is comprised in the first realm 113 which then comprises both the first VLAN 115 and the second VLAN 118. This will be explained more in detail below. The first and second VLANs 115 and 118 may e.g. be Ethernet VLANs.

Traffic flows may be transmitted to the UE 102 from the local service cloud 112 in a DL local break out 130 and from the UE 102 to the local service cloud 112 in an UL local beak out 132. Selection of VLAN and/or realm for the UE for local break out of traffic flows to the local service cloud 112 is handled by the network node 110.

Embodiments herein aims to create UE IP address uniqueness from the point of view of the local service cloud 112 by isolating non-unique UE IP addresses from each other. In an example, so-called address realms such as the first realm 113 and the second realm 116 are created and UE IP addresses used within a certain realm are unique within that realm.

Embodiments herein use VLANs such as Ethernet VLANs and parallel VMs to create such realms. Instead of having just one VM with an associated VLAN to support a service in a Local Service Cloud, the same service may be running on multiple VMs, each with an associated VLAN. The network node 110 such as e.g. the local breakout router and function, with associated functionality in the network node 110 keeps track of UE IP addresses that are being used within a certain VLAN. This information may e.g. be included in the local breakout states. This ensures that traffic flows to be broken out which originate from different UEs but have the same UE IP address are allocated to different VLANs. If the UE IP address of a new traffic flow to be broken out is not being used in any of the VLANs leading to a VM supporting the concerned service, the VLAN and associated VM may be chosen freely, e.g. based on the current load of the VM. However, if the UE IP address is already being used in one or more of the relevant VLANs the choice of VLAN and associated VM is restricted to the ones that support the service and are associated with VLANs in which the concerned UE IP address is not being used.

Note that although the embodiments herein are described in terms of EPS/LTE, the basic principles of the embodiments are applicable also to $3^{rd}$ Generation/UMTS/WCDMA/High Speed packet Access (HSPA) although in that scenario it may be preferable to locate the local service cloud 112 at a Radio Network Controller (RNC) site.

Figure 2:
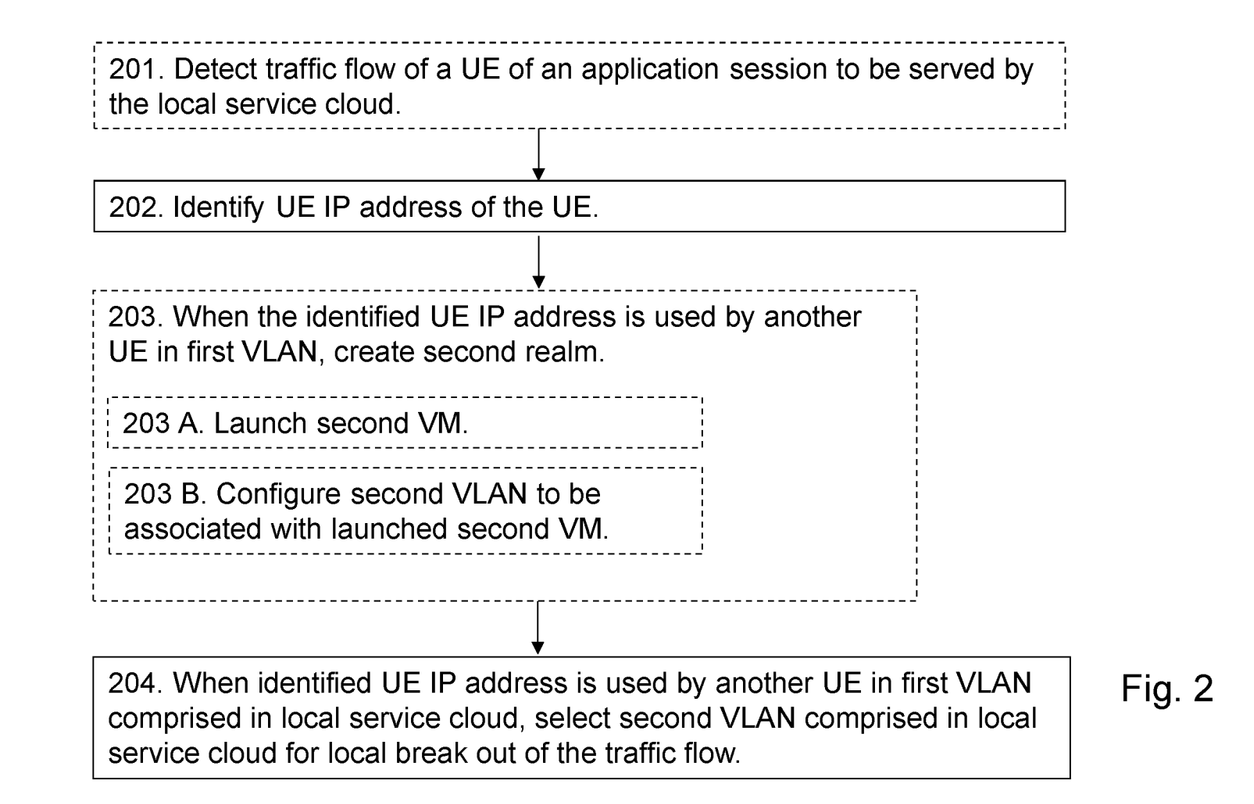
FIG. 2 is a flowchart depicting embodiments of a method in a network node.

Example embodiments of a method in a network node 110 for handling a traffic flow of the UE 120 will now be described with reference to a flowchart depicted in FIG. 2. As mentioned above, the network node 110 is related to the local service cloud 112. The traffic flow is related to an application session to be served by the local service cloud 112. In some embodiments, the network node 110 is comprised in the base station 101, for example co-located with the base station 101.

There are at least two different embodiments for provisioning of VLANs and/or realms. The second embodiment is described in Action 203 below. In the first embodiment the VLANs and/or realms also referred to as address realms may be allocated in advance such that a set of VLANs and/or address realms exist. Thus, a set of VLANs may be allocated in advance. The set of VLANs comprises the first VLAN 115 and the second VLAN 118. As an alternative, a set of realms is allocated in advance, which set of realms comprises the first realm 113 comprising the first VLAN 115 and the second realm 116 comprising the second VLAN 118.

The method comprises the following actions, which actions may be taken in any suitable order. Dashed lines of some boxes in FIG. 2 indicate that this action is not mandatory.

Action 201

In an example scenario, the network 110 node monitors the traffic flow between UEs and the base station 101 on order to detect a traffic flow of an application session to be served by the local service cloud 112. Thus in this action the network node 110 detects the traffic flow of the UE 102, which traffic flow is related to an application session to be served by the local service cloud 112. The packet's IP header is looked at to obtain the 5-tuple namely, source IP, source port, destination IP, destination port, protocol.

Action 202

The network node 110 keeps track of UE IP addresses that are being used within a certain VLAN. This may be performed by the network node 110 e.g. by means of a local breakout router and function, with associated functionality in the network node 110 may keep track of UE IP addresses that are being used within a certain VLAN. A local breakout router may match particular traffic flows and forwards the traffic to the local service cloud. In functionality it is similar to a standard router and it is configured with specific rules to match certain traffic flows that need to be broken out, redirected and/or forwarded, towards the local service cloud. This information may e.g. be included in the local breakout states. This is used to be able to ensure that traffic flows to be broken out which originate from different UEs but have the same UE IP address are allocated to different VLANs. Thus, when the network node 110 has detected the traffic flow of the UE 102 in this example scenario, the network node 110 identifies a UE IP address of the UE 120.

Action 203

As mentioned above, there are at least two different embodiments for provisioning of VLANs and/or realms. In the first embodiment described above the VLANs and/or address realms are allocated in advance. In a second embodiment address realms are created on-demand. If a traffic flow with UE IP address is detected for which there is currently no VM and/or VLAN available that fulfills the criteria, e.g. that supports the concerned service and lacks the concerned UE IP address, then a new VM is launched for the concerned service and a new VLAN is established and associated with the VM. This may e.g. be done by the network node 110 or an orchestration function in the local service cloud 112.

Thus, when the identified UE IP address is used by the other UE in the first VLAN 116, the network node 110 creates a second realm 116. This may be performed by launching 403A a second VM 117, and configuring 403B the second VLAN 118 to be associated with the launched second VM 117.

As an alternative, when the identified UE IP address is used by another UE in the first VLAN 116, the network node 110 may configure the second VLAN 118. This action is related to 403B.

In some embodiments, the configuring of the second VLAN 118 is performed when there is no VLAN available in which the identified UE IP address is not used by another UE.

Action 204

If the UE IP address of a new traffic flow to be broken out is not being used in any of the VLANs leading to a VM supporting the concerned service, the VLAN and associated VM may be chosen freely, e.g. based on the current load of the VM. However, if the UE IP address is already being used in one or more of the relevant VLANs the choice of VLAN and associated VM is restricted to the ones that support the service and are associated with VLANs in which the concerned UE IP address is not being used. Thus, when the identified UE IP address is used by another UE in the first VLAN 115 comprised in the local service cloud 112, the network node 110 selects a second VLAN 118 comprised in the local service cloud 112 for local break out of the traffic flow of the application session to the local service cloud 112. In the second VLAN 118, the identified UE IP address is not used by another UE. In the example scenario, the service related to the traffic flow is supported by the second VLAN 118.

In some embodiments, the first VLAN 115 and the first Virtual Machine 114, VM, associated with the first VLAN 115 are comprised in the first realm 113.

The selecting of the second VLAN 118 may be performed by selecting the second realm 116 comprising the second VLAN 115 and a second VM 117 associated with the second VLAN 118.

According to embodiments herein, instead of having just one VM with an associated VLAN to support a service in a Local Service Cloud, the same service as the service related to the traffic flow may be running on multiple VMs, wherein each VM may be associated with one or more VLANs. This means for example that if in a first checked VLAN no other UE uses the identified UE IP address of the UE102, but the service related to the traffic flow of the UE 102 is not supported by this first VLAN, other VLANs shall be checked until a VLAN is found where no other UE uses the identified UE IP address of the UE102, and the service related to the traffic flow of the UE 102 is supported.

In a variation of embodiments herein, the VLAN based separation is achieved by configuring multiple VLANs to each VM instead of introducing parallel VMs, each with a single VLAN. This eliminates the need for multiple parallel VMs hosting the same application server(s). Thus, the first realm 113 comprises the first VM 114, the first VLAN 115 and the second VLAN 118. The first VM 114 is associated with the first VLAN 115 and the second VLAN 118.

The text below is applicable to any suitable embodiment described above.

As mentioned above, the realms may be handled according to at least two embodiments, the first embodiment and the second embodiment:

The first embodiment relates to address allocation to existing realms, e.g. in the form of VMs with associated VLANs. Realms are provisioned before the selection is made. The first embodiment may simply be described with the sequence diagram below. In this case a sufficient number of address realms have been provisioned beforehand. The procedure of the method according to the first embodiment may be performed according to a flowchart of FIG. 3

Action 301: Detect a traffic flow of an application session to be served by the local service cloud 112. This relates to Action 201.

Action 302: Get the UE IP address of the UE 102. This relates to Action 202.

Action 303: Start with realm 1, such as e.g. the first realm 113. Set i=1, where 'i' is an iteration variable that is used in the algorithm.

Action 304: Check if any other UE is using the identified UE IP address in realm 1.

Action 305: If yes, the IP identified UE IP address in realm 1 is used by another UE, set i=i+1 and go to next realm, such as the second realm 116.

Action 306: If no, the IP identified UE IP address is not used in realm i, book UE IP address in realm i. This relates to Action 204.

Action 307: Set local break out to the VLAN such as the second VLAN 118, corresponding to realm i such as realm 116. This relates to Action 204

The second embodiment relates to on-demand provisioning of a realm with orchestration functions, when the need arises. The second embodiment adds a dynamic provisioning step to the sequence where the cloud orchestration functionality may be used for the provisioning system. Provisioning system in this context is something which is capable of provide cloud resources such as VMs, VLANs, IP addresses etc. The cloud orchestration functionality is often part of a cloud management architecture. The procedure of the method according to the second embodiment may be performed according to a flowchart of FIG. 4.

Figure 4:
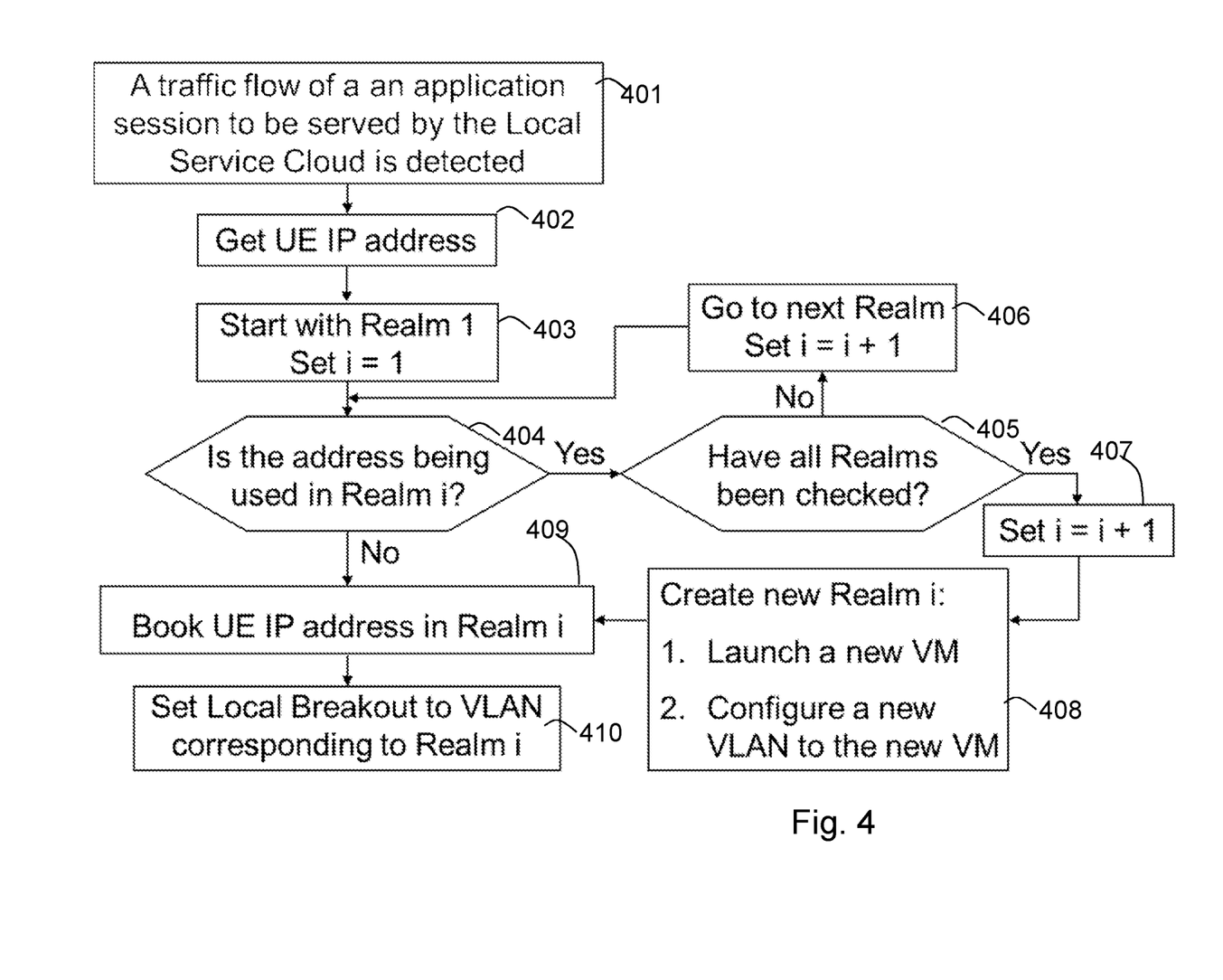
FIG. 4 is a flowchart depicting embodiments of a method in a network node.

Action 401: Detect a traffic flow of an application session to be served by the local service cloud 112. This relates to Action 201.

Action 402: Get the UE IP address of the UE 102. This relates to Action 202.

Action 403: Start with realm 1, such as e.g. the first realm 113. Set i=1.

Action 404: Check if any other UE is using the identified UE IP address in realm 1.

Action 405: If yes, the IP identified UE IP address in realm 1 is used by another UE, check if all available realms have been checked if any other UE is using the identified UE IP address in the respective realm.

Action 406: If no, all available realms have not been checked, set i=i+1 and go to next realm.

Action 407: If yes, all available realms have been checked, set i=i+1 and go to create a new realm.

Action 408: Create a new realm, such as e.g. the second realm 116, by launching a new VM such as the second VM 117, and configuring a new VLAN such as the second VLAN 118 to be associated with the new VM. This relates to Action 203.

Action 409: Book UE IP address in realm i or the new realm, such as realm 116. This relates to Action 204. This relates to Action 204.

Action 407: Set local break out to the VLAN such as the VLAN 118, corresponding to realm 1 or the new realm, such as realm 116. This relates to Action 204.

In some embodiments, multiple VLANs are associated to the same VM, e.g. such that both the first VLAN 115 and the second VLAN 118 are associated to the first VM 114. This variation of the embodiments uses a slightly different approach. Instead of having just one VLAN associated with each VM, multiple VLANs can be used towards every VM and thus to every application server in the Local Service Cloud. In this context, a server is a service application running inside a VM. A VM may e.g. have an interface on each VLAN associated with it and different IP addresses on these interfaces.

As in the embodiments described above, the Local Breakout router and/or function, and associated functionality, keeps track of the UE IP addresses that are being used within a certain realm and/or VLAN. This information may e.g. be included in the local breakout states, and may ensure that traffic flows to be broken out which originate from different UEs but have the same UE IP address are allocated to different VLANs. If different VMs are selected for the traffic flows, e.g. because the concerned application servers reside on different VMs, no further action is needed to provide the separation of the non-unique UE IP addresses, but if the same VM is chosen for more than one of the traffic flows, the selection of VLAN becomes critical. Flows with non-unique UE IP addresses will in that case be allocated different VLANs to the same VM.

Similar to the realm provisioning in the embodiments described above, the multiple VLANs to a single VM may be proactively provisioned beforehand or dynamically provisioned when the need arises.

Figure 5:
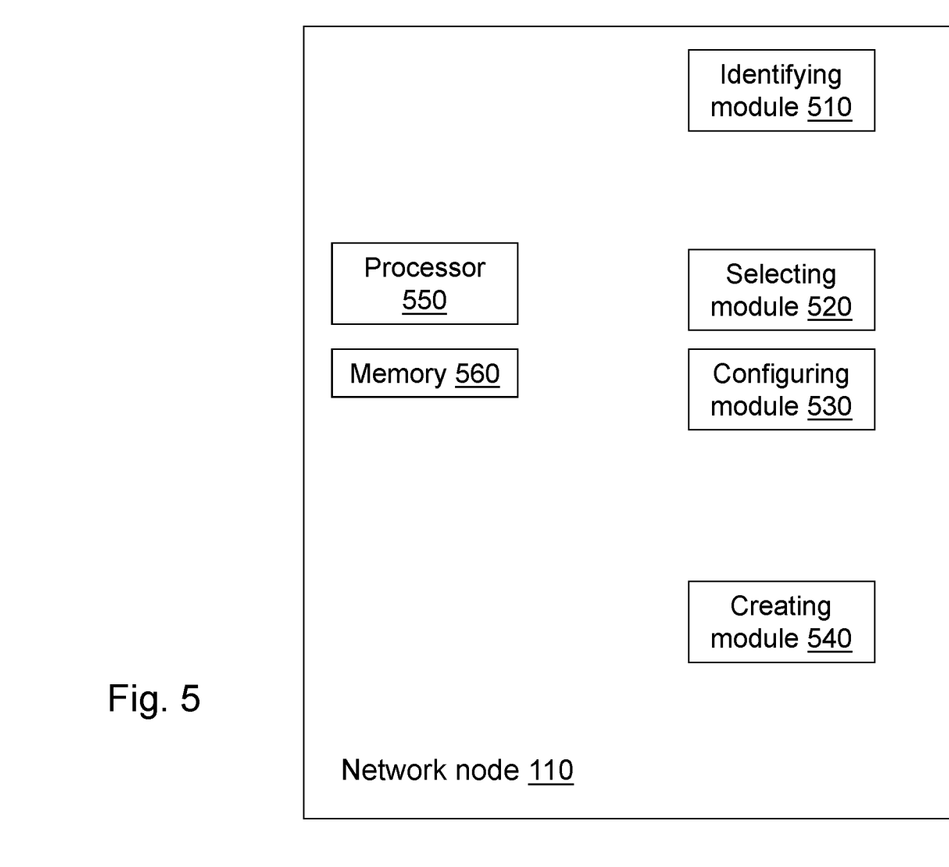
FIG. 5 is a schematic block diagram illustrating embodiments of a network node.

To perform the method actions for handling a traffic flow of the UE 120 described above in relation to FIGS. 2, 3 and 4, the network node 110 may comprises the following arrangement depicted in FIG. 5. As mentioned above, network node 110 is arranged to be related to a local service cloud 112 and which traffic flow is related to an application session to be served by the local service cloud 112. The network node 110 may be arranged to be comprised in a base station.

The network node 110 is configured to, e.g. by means of an identifying module 510 configured to, identify a UE IP address of the UE 120.

The network node 110 is further configured to e.g. by means of a selecting module 520 configured to, select a second VLAN 118 comprised in the local service cloud 112 for local break out of the traffic flow of the application session to the local service cloud 112, when the identified UE IP address is used by another UE in a first Virtual Local Area Network 115, VLAN comprised in the local service cloud 112. In the second VLAN 118, the identified UE IP address is not used by another UE.

In some embodiments as mentioned above, the first VLAN 115 and the first VM 114 associated with the first VLAN 115 may be comprised in a first realm 113.

In some embodiments the network node 110 is further configured to select the second VLAN 118 by selecting a second realm 116 comprising the second VLAN 115 and the second VM 117 associated with the second VLAN 118.

The network node 110 may further be configured to e.g. by means of a configuring module 530 configured to, configure the second VLAN 118, when the identified UE IP address is used by the other UE in the first VLAN 116.

The network node 110 may further be configured to, e.g. by means of a creating module 540 configured to create a second realm 116, when the identified UE IP address is used by another UE in the first VLAN 116. This may be performed by launching a second VM 117, and configuring the second VLAN 118 to be associated with the launched VM. The network node 110 may further is configured to perform the configuring the second VLAN 118, when there is no VLAN available in which the identified UE IP address is not used by another UE.

In some embodiments, a set of VLANs is arranged to be allocated in advance, which set of VLANs is arranged to comprise the first VLAN 115 and the second VLAN 118.

In some embodiments, a set of realms is arranged to be allocated in advance. The set of realms is arranged to comprise a first realm 113 comprising the first VLAN 115 and a second realm 116 comprising the second VLAN 118.

In some embodiments, the first realm 113 is arranged to comprise a first VM 114, the first VLAN 115 and the second VLAN 118, wherein the first VM 114 is arranged to be associated with the first VLAN 115 and the second VLAN 118.

According to embodiments herein, instead of having just one VM with an associated VLAN to support a service in a Local Service Cloud, the same service as the service related to the traffic flow may be arranged to be running on multiple VMs, Wherein each VM may be associated with one or more VLANs. In the example scenario, the service related to the traffic flow is arranged to be supported by the second VLAN 118.

The embodiments herein comprising the process of handling a traffic flow of the UE 120, be implemented through one or more processors, such as a processor 550 in the network node 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to network node 110.

The network node 110 may further comprise a memory 560 comprising one or more memory units. The memory 560 comprises instructions executable by the processor 690.

The memory 560 is arranged to be used to store e.g. UE IP addresses, information about local service clouds such as the local service cloud 112, data, configurations, and applications to perform the methods herein when being executed in the network node 110.

Those skilled in the art will also appreciate that the an identifying module 510, selecting module 520, configuring module 530, and creating module 540 described above may refer to a combination of analog and digital circuits, and/or one or more processors configured with software and/or firmware, e.g. stored in the memory 560, that when executed by the one or more processors such as the processor 550 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method in a network node for handling a traffic flow of a User Equipment (UE), wherein the network node is related to a local service cloud, and wherein the traffic flow is related to an application session to be served by the local service cloud, the method comprising:
   identifying a UE Internet Protocol (IP) address of the UE; and
   responsive to a determination that the identified UE IP address is used by another UE in a first Virtual Local Area Network (VLAN) comprised in the local service cloud, selecting a second VLAN comprised in the local service cloud for local break out of the traffic flow of the application session to the local service cloud, where the identified UE IP address is not used by another UE in the second VLAN.

2. The method according to claim 1, wherein the first VLAN and a first Virtual Machine (VM) associated with the first VLAN are comprised in a first realm.

3. The method according to claim 2, wherein selecting the second VLAN is performed by selecting a second realm comprising the second VLAN and a second VM associated with the second VLAN.

4. The method according to claim 1, wherein, responsive to the determination that the identified UE IP address is used by another UE in the first VLAN, configuring the second VLAN.

5. The method according to claim 4, wherein the configuring of the second VLAN is performed responsive to a determination that there is no VLAN available in which the identified UE IP address is not used by another UE.

6. The method according to claim 1, wherein, responsive to the determination that the identified UE IP address is used by another UE in the first VLAN, creating a second realm by:
   launching a second VM; and
   configuring the second VLAN to be associated with the launched second VM.

7. The method according to claim 1, wherein a set of VLANs is allocated in advance, and wherein the set of VLANs comprises the first VLAN and the second VLAN.

8. The method according to claim 1, wherein a set of realms is allocated in advance, and wherein the set of realms comprises a first realm comprising the first VLAN and a second realm comprising the second VLAN.

9. The method according to claim 1, wherein a first realm comprises a first VM, the first VLAN and the second VLAN, and wherein the first VM is associated with the first VLAN and the second VLAN.

10. The method according to claim 1, wherein the same service as a service related to the traffic flow is running on multiple VMs in the local service cloud.

11. The method according to claim 1, wherein a service related to the traffic flow is supported by the second VLAN.

12. The method according to claim 1, wherein the network node is comprised in a base station.

13. A network node configured for handling a traffic flow of a User Equipment (UE), wherein the traffic flow is related to an application session to be served by a local service cloud, the network node comprising processing circuitry configured to:
   identify a UE Internet Protocol (IP) address of the UE; and
   responsive to a determination that the identified UE IP address is used by another UE in a first Virtual Local Area Network (VLAN) comprised in the local service cloud, select a second VLAN comprised in the local service cloud for local break out of the traffic flow of the application session to the local service cloud, wherein in the second VLAN, the identified UE IP address is not used by another UE.

14. The network node according to claim 13, wherein the first VLAN and a first Virtual Machine (VM) associated with the first VLAN are comprised in a first realm.

15. The network node according to claim 14, wherein the processing circuitry is configured to select the second VLAN by selecting a second realm comprising the second VLAN and a second VM associated with the second VLAN.

16. The network node according to claim 14, wherein the processing circuitry is configured to, responsive to the determination that the identified UE IP address is used by another UE in the first VLAN, create a second realm by:
  launching a second VM; and
  configuring the second VLAN to be associated with the launched second VM.

17. The network node according to claim 13, wherein the processing circuitry is configured to configure the second VLAN, responsive to the determination that the identified UE IP address is used by another UE in the first VLAN.

18. The network node according to claim 17, wherein the processing circuitry is configured to perform the configuring of the second VLAN, responsive to a determination that there is no VLAN available in which the identified UE IP address is not used by another UE.

19. The network node according to claim 13, wherein a set of VLANs is arranged to be allocated in advance, and wherein the set of VLANs is arranged to comprise the first VLAN and the second VLAN.

20. The network node according to claim 13, wherein a set of realms is arranged to be allocated in advance, and wherein the set of realms is arranged to comprise a first realm comprising the first VLAN and a second realm comprising the second VLAN.

21. The network node according to claim 13, wherein a first realm is arranged to comprise a first VM, the first VLAN and the second VLAN, and wherein the first VM is arranged to be associated with the first VLAN and the second VLAN.

22. The network node according to claim 13, wherein the same service as a service related to the traffic flow is arranged to be running on multiple VMs in the local service cloud.

23. The method according to claim 13, wherein a service related to the traffic flow is arranged to be supported by the second VLAN.

24. The network node according to claim 13, wherein the network node is arranged to be comprised in a base station.

* * * * *